United States Patent
Schaefer

(10) Patent No.: US 6,746,774 B1
(45) Date of Patent: Jun. 8, 2004

(54) LEATHER AND PROCESS FOR ITS PRODUCTION

(76) Inventor: Philipp Schaefer, Am Leinewehr 25, 30519 Hannover (DE)

( * ) Notice: Subject to any disclaimer, the term of this patent is extended or adjusted under 35 U.S.C. 154(b) by 252 days.

(21) Appl. No.: 09/655,284

(22) Filed: Sep. 5, 2000

(30) Foreign Application Priority Data

Sep. 13, 1999 (AT) .............................. 622/99 U

(51) Int. Cl.⁷ ........................ B32B 27/00; B32B 3/00; B32B 9/02
(52) U.S. Cl. ................ 428/423.4; 428/313.3; 428/313.5; 428/314.4; 428/314.8; 428/306.6; 428/473; 428/151; 428/323; 428/87; 428/95; 428/52
(58) Field of Search ............. 428/423.4, 313.3, 428/313.5, 314.4, 314.8, 306.6, 473, 151, 323, 87, 95, 52

(56) References Cited

U.S. PATENT DOCUMENTS

| | | | |
|---|---|---|---|
| 2,126,321 A | | 8/1938 | Freudenberg et al. |
| 4,016,326 A | * | 4/1977 | Schaefer .................. 428/305.5 |
| 4,581,261 A | * | 4/1986 | Schaefer et al. ............. 428/151 |
| 4,751,116 A | * | 6/1988 | Schaefer et al. .............. 428/15 |
| 4,849,145 A | * | 7/1989 | Hirsch ........................ 264/135 |
| 4,923,732 A | * | 5/1990 | Schaefer ..................... 428/151 |
| 4,983,245 A | * | 1/1991 | Schaefer ..................... 156/231 |
| 5,669,670 A | | 9/1997 | Haraguchi et al. |

FOREIGN PATENT DOCUMENTS

| | | |
|---|---|---|
| DE | 31 17 721 C2 | 11/1982 |
| DE | 33 09 992 A1 | 9/1984 |
| DE | 85 36 014.7 U1 | 3/1986 |
| DE | 299 08 503.1 U1 | 8/1999 |
| EP | 0 002 465 A1 | 6/1979 |

* cited by examiner

*Primary Examiner*—Daniel Zirker
*Assistant Examiner*—Victor S Chang
(74) *Attorney, Agent, or Firm*—Laurence A. Greenberg; Werner H. Stemer; Ralph E. Locher

(57) ABSTRACT

In order to provide leather with the desired cushioning properties and desirable soft handling properties, especially a grained leather with a grain structure on its upper surface, or a split leather with a surface finish, even if this leather is of minimal thickness, a foam layer is created on the non-visible underside surface of the leather. This foam layer is formed by applying a liquid plastic material containing means to create the foam and is subsequent solidified by removal of the solvent.

11 Claims, 1 Drawing Sheet

LEATHER AND PROCESS FOR ITS PRODUCTION

BACKGROUND OF THE INVENTION

FIELD OF THE INVENTION

The invention relates to a leather. More specifically, the invention relates to a grained leather with a surface grain structure on its visible side, or a split leather with a surface finish, which has on its non-visible underside a surface coating or layer. Furthermore, the invention relates to a process for the production of such leathers. The term 'Grained Leather' also includes Nubuk-leathers, as well as natural leathers to which a surface grain has been applied. As leathers, especially cow hide, calf leather, kangaroo leather and goat leather may be utilized.

Especially thin napped leathers, which are used, for example, in the production of shoes or in automobile interiors, are usually of minimal thickness and therefore tend to lack sufficient cushioning properties. Nevertheless, leather, because of its very soft handling properties, even at a low weight per area, is still the preferred material, especially for use in car interiors and for foot wear, but is also used in other applications, for example, for luggage. As such very thin leathers lack this desirable softness to the touch, present procedures are to bond foam sheeting with adhesives to the non-visible underside of the leather.

The U.S. Pat. No. 5,669,670 describes an application for automobile seats in which the leather is bonded to some foam material only at the edges and subsequently sown up. Such processes tend to be very labor intensive, costly and produce a lot of waste, since the foam sheets have to be cut to match the size of the piece of leather. An essential disadvantage of this process is that the foam material bonded to the underside of the leather can easily come apart or split, since the foam itself tends to have little internal strength. Furthermore, if such leather has to be shaped or formed, as in the case of making shoes, fitting out car interiors, making coor inlays, covering consoles for equipment, steering wheels and similar, any uncontrolled and undesirable movements of the laminated leather may produce unattractive slippage areas and creases.

In order to achieve the desired degree of cushioning, the bonded foam sheeting must have a thickness of greater than 1 mm. Such foams are easily compressed in volume by a minimal forces and the cushioning effects is therefore lost.

Utility Model DE 29908503.1 U1 already describes a process whereby the reverse side of a leather, with an upper surface finish, is given a coating of a primer which improves the adhesion between the leather and a surface to which the leathers is to be attached. Such an adhesive aid, simply applied to the leather surface, does not exhibit a foam structure.

SUMMARY OF THE INVENTION

It is accordingly an object of this invention to overcome the above mentioned disadvantages and to create leather that exhibits an optimal elastic recovery even at minimal thickness. Such leather would possess the desired cushioning properties, a soft handle and a low mass to area ratio.

With the foregoing and other objects in view there is provided, in accordance with the invention, the application of a plastic material in liquid form to the non-visible underside surface of the leather, which subsequently sets into a foam layer when the solvent is removed. Such foam terminates, even at low thickness and density, provides the leather with the desired cushioning as well as soft handling properties. The foam layer is also intimately bonded to the leather so that it is unlikely than it would become detached. Contrary to leathers with conventionally bonded foam sheeting, uncontrolled and undesirable movements between the leather and the foam layer of this invention is not possible and annoying shippage areas would therefore not appear.

It was found to be efficacious for the foam layer to have open as well as enclosed cells, preferably at least 85% enclosed cells.

According to the preferred embodiment of the invention, the foam layer is applied so that at least a part of the plastic material becomes impregnated into the leather surface. In this way, the fibers on the leather's underside surface become embedded in the material, which also fills any hotels so that an intimate contact between the leather and the foam material is assured.

According to this invention, the foam layer may consist of plastic dispersions that solidify as a foam, more specifically it may consist of solidified dispersions containing a cross linking agent as well as Polyurethane and/or Polyacrylic acid esters. It is further possible to produce the foam layer from a solidified dispersion containing Polybutadiene and/or Polystyrene and/or Chlorinated Rubber. In such cases, the foam layer may simultaneously act as an adhesive, when the leather-foam laminate is bonded onto a plastic surface of compatible chemical composition by a direct spraying or foaming process.

The above mentioned plastic dispersions in liquid form, after they are applied, penetrate partly into the leather surface where they, on solidifying, do not only ensure an intimate bonding with the leather, but also provide the leather on its underside with a resilient, elastic reinforcement.

In order to achieve the desired foam structure, this invention proposes that the foam layer contains hollow spheres of microscopic size, with the spheres thin shells of plastic material enclosing a gas, preferably air. These micro-spheres form enclosed cells acting as air cushions and create the desired cushioning effect and soft handle. However, the foam layer may also be produced through the incorporation of tiny air bubbles, which also produce a partly open cellular structure, into the foamed plastic material.

The thickness of the foam layer can be varied to suit the desired requirements and could, for example, be 1 mm. Unexpectedly, it was found that the desired cushioning effect was already produced by a foam layer thickness of less than 0.3 mm. For practical purposes, foam layers with densities between 0.1 to 0.6 $g/cm^3$ are suitable, the preferred density being 0.3 $g/cm^3$.

Furthermore, it is advantageous if the foam layer formed from a plastic dispersion which forms a film, after the removal of the solvent material, that has a hardness of less than 90 Shore A units, preferably less than 45 Shore A units.

Should such a foam layer of 0.3 mm thickness be subjected to a load factor of 1 $kg/cm^2/h$, then a maximal 20% compression would result, on removing the load, the material would return to its original thickness.

As a covering for the foam layer on the non-visible side, sheeting, such as textile cloth, leather or fleece material may be bonded to the foam.

With the foregoing and other objects in view there is provided, in accordance with the invention, a process for producing leather, especially grained leather with a grain structure on its surface, or split leather with a surface finish, which has on its non-visible underside a surface coating or layer, is, accordingly to the invention, characterized by the fact that, a plastic material in liquid form is applied to the underside surface, which contains means to create a foam and which may be solidified, preferably by heating curing. The foam layer may be formed by applying a number of layers one after the other. According to the invention, the application of the liquid plastic material is preferably carried out by means of an adhesive spraying process. It is also, possible to apply the material onto the leather underside by means of a roller, e.g. with roller equipment. For practical purposes, a dispersion containing a cross linking agent and Polyurethane and/or Polyacrylic acid ester is applied on the underside of the leather.

To create a foam structure, there are embedded into the liquid plastics material before it is applied hollow microscopic spheres, the shells of which consist of thin plastic films enclosing a gas, preferably air. Such micro-spheres may be formed in situ, from plastic particles embedded into the plastic material before it is applied, which in a subsequent heating stage, form hollow microscopic spheres, whose thin plastic shells enclose a gas, preferably air.

A foam structure may also be produced by the incorporation of air, for example by means of stirring or injection, into the liquid plastics material before it is applied. In practice, the foam layer is formed by both the incorporation of hollow micro-spheres and tiny air bubbles.

As a covering for the liquid plastic material applied to the underside of the leather, sheeting such as textile cloth, leather or fleece materials may be utilized. In this way, the adhesive properties of the plastic material may be used to bond the sheeting to the foam layer.

BRIEF DESCRIPTION OF THE DRAWINGS

With reference to FIG. 1, there is seen a grained leather 1, which is, opposite to its grain structure 2, an underside surface 3 with large protruding fibers 4. The foam layer 5 proposed for this surface 3 is one containing both open and enclosed cells 6. These cells are formed from, for example, hollow micro-spheres with their thin plastic shell trapping air or are formed by tiny air bubbles. The foam layer 5 encloses the fibers 4 and penetrates partly into the surface of the underside 3 of leather 1, so that an intimate connection with the leather is achieved. In this way, the resilience and elasticity of the leather is not only improved, but the cushioning effect and the soft handle is also markedly enhanced, even with thin leathers of thickness of less than 1.5 mm. It is preferable to produce the foam layer by applying a liquid dispersion containing a cross linking agent and Polyurethane and/or Polyacrylic acid ester, by means of an airless spraying process or by use of rollers. After its application, the dispersion is solidified, preferably by a heat curing process, with the water being absorbed, at least partly by the leather.

Figure 1:
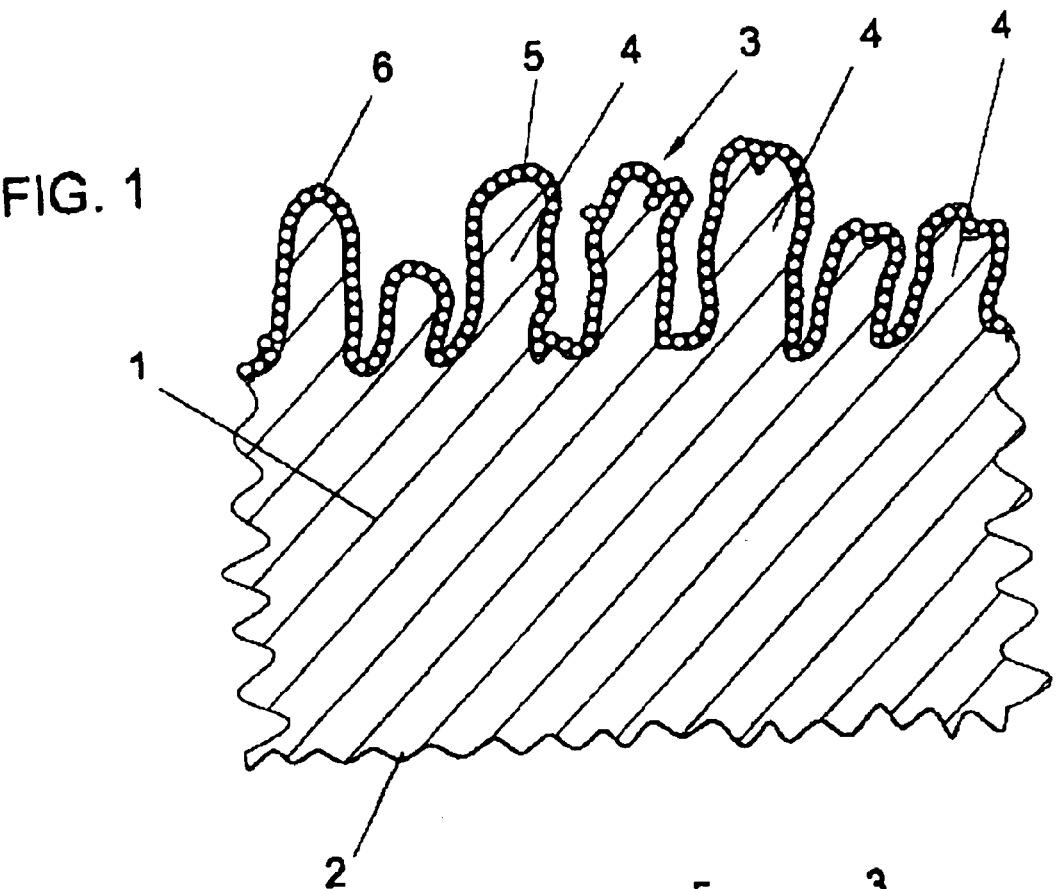
FIG. 1 is a cross section view of a leather with a rough underside surface in enlarged format.
Figure 2:
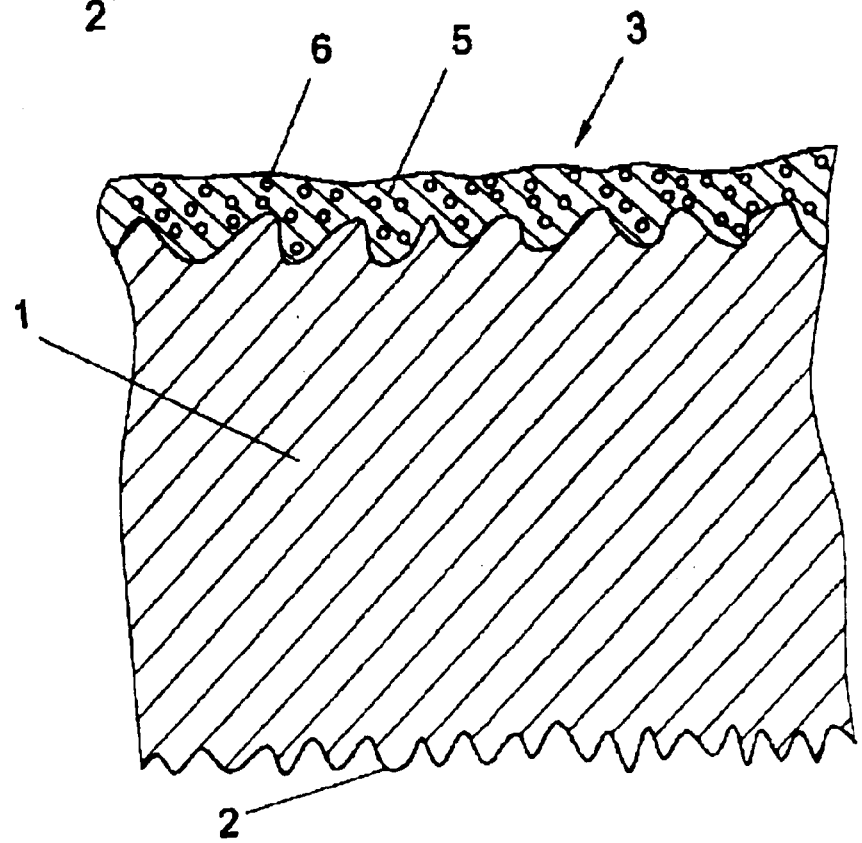
FIG. 2 is a cross section view of a leather with a smoother underside surface in enlarged format.

The embodiment shown in FIG. 2 shows grained leather 1 which has a smooth, fine fibrous underside surface 3. Here, the foam layer is evenly spread over the surface and shows enclosed cells 8 of hollow micro-spheres, which are surrounded by open cells.

This invention may also be applied to split leathers, which have, on their visible upper surface, opposite the underside surface 3, some form of surface finish instead of a grained structure.

The foam layer 5 on non-visible underside of the leather may have a covering, not shown in the Figures, consisting of sheeting, such as textile cloth, leather or fleece materials.

I claim:

1. A leather assembly, comprising:
   a leather selected from the group consisting of a grained leather showing a grain structure on an upper surface thereof and a split leather with a surface finish; and
   a coating layer on a non-visible underside surface of said leather, said coating layer being a foam layer formed by applying a liquid plastic dispersion with a solvent and subsequently setting the coating layer by removing the solvent and forming a solidified dispersion;
   said foam layer having closed cells and open cells, with said closed cells formed of hollow microspheres comprising gas-tight shells of plastic enclosing a gas, and open cells filling interspaces between said closed cells;
   said solidified dispersion having a hardness of less than 45 Shore A units and a density of less than 0.3 g/cm$^3$; and
   said solidified dispersion enclosing fibers projecting from said underside surface of said leather, with individual enclosed fibers or fiber bundles individually projecting from said underside surface of said leather.

2. The leather assembly according to claim 1, wherein said foam layer has a density of substantially 0.3 g/cm$^3$.

3. The leather assembly according to claim 1, wherein said foam layer has at least 85% of closed cells.

4. The leather assembly according to claim 1, wherein said foam layer is formed in such a manner that it becomes at least partially impregnated into the leather.

5. The leather assembly according to claim 1, wherein said foam layer consists of a solidified dispersion containing a cross linking agent and a material selected from the group consisting of polyurethane and polyacrylic acid ester.

6. The leather assembly according to claim 1, wherein said foam layer consists of a solidified dispersion of polybutadiene and/or polystyrene and/or chlorinated rubber.

7. The leather assembly according to claim 1, wherein said foam layer is formed through the incorporation of tiny air bubbles into a plastic material forming the foam.

8. The leather assembly according to claim 1, wherein a thickness of the foam layer is less than 0.3 mm.

9. The leather assembly according to claim 1, wherein said foam layer has a thickness of 0.3 mm and the thickness, when subjected to a load factor of 1 kg/cm$^2$/h, is decreased by a maximum of 20%, and will, on removing the load, return to its original thickness.

10. The leather assembly according to claim 1, wherein said foam layer on the side not bonded to said leather, is covered by sheeting selected from the group consisting of textile cloth, leather, and fleece material.

11. The leather assembly according to claim 1, wherein said leather has a thickness of less than 1.5 mm.

* * * * *